March 25, 1924.
F. W. JACKSON
PLUG RETAINER
Filed March 31, 1923
1,488,393
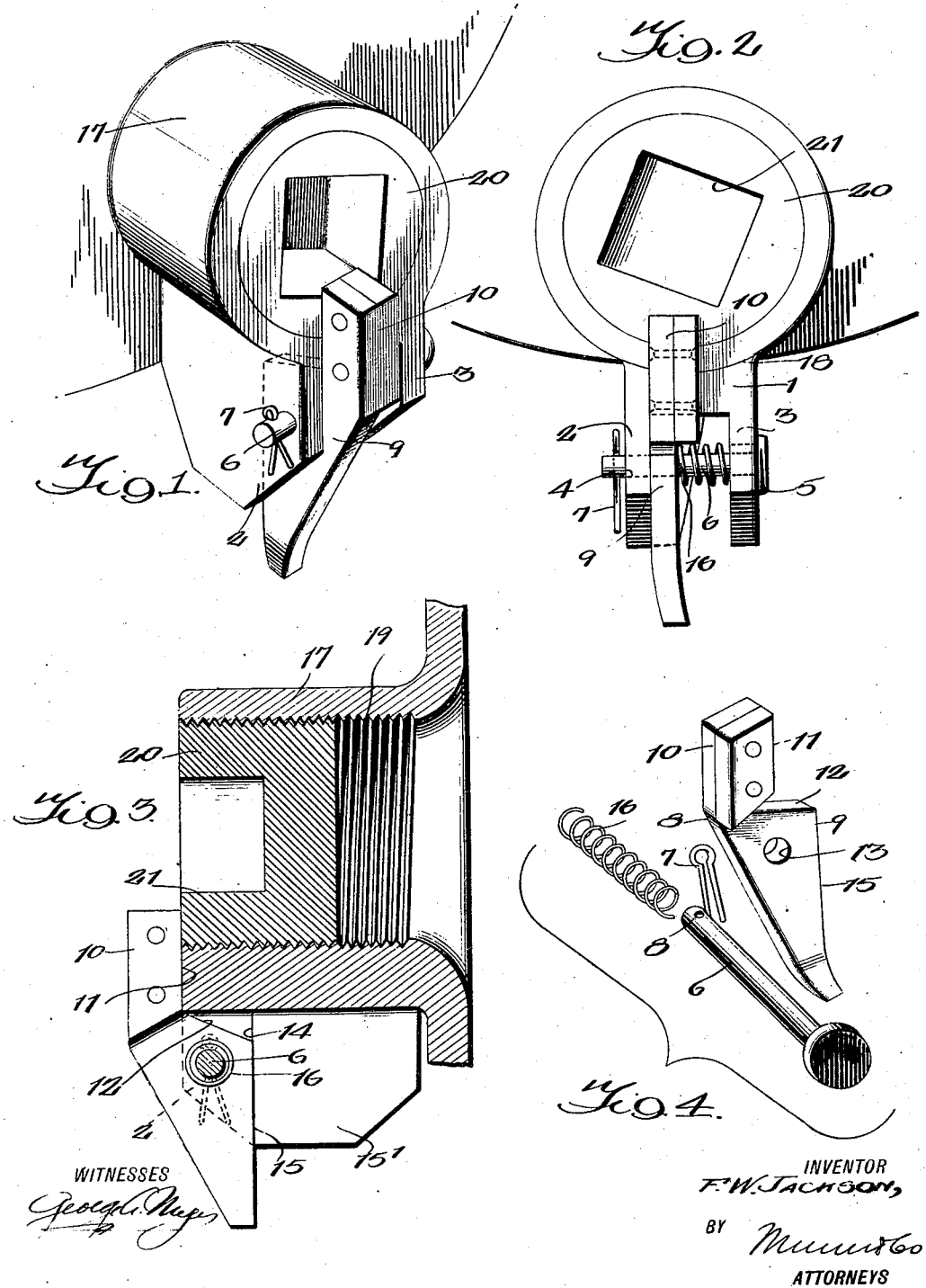
INVENTOR
F. W. JACKSON,
BY
ATTORNEYS
WITNESSES Patented Mar. 25, 1924.

1,488,393

UNITED STATES PATENT OFFICE.

FRED W. JACKSON, OF NEEDLES, CALIFORNIA.

PLUG RETAINER.

Application filed March 31, 1923. Serial No. 629,128.

*To all whom it may concern:*

Be it known that I, FRED W. JACKSON, a citizen of the United States, and resident of Needles, in the county of San Bernardino and State of California, have invented certain new and useful Improvements in Plug Retainers, of which the following is a specification.

My invention is a device which is adapted to be associated with a tubular body and which affords facilities for holding a plug or like closure against accidental displacement from closing relation to the tubular body, and it consists in the combinations, constructions and arrangements herein described and claimed.

An object of the invention is to provide a device of the character described which is extremely simple in construction and economical to manufacture, thoroughly effective for the purpose intended and not likely to get out of order easily.

A further object of the invention is to provide a device of the character described which can be secured to tubular bodies of various sizes in a desirable relation to closures interfitting such bodies without any extensive changes, if any, being required in the usual construction of the tubular body, and which when in applied position on a tubular body requires the use of no tools to effect manipulation thereof.

Other objects and advantages will be apparent from the following description, considered in conjunction with the accompanying drawings, in which—

Figure 1 is a perspective view of a tubular body having a plug in one end thereof and being equipped with a practical embodiment of the invention, Figure 2 is a plan view of the structure shown in Figure 1, Figure 3 is a longitudinal central section through the structure shown in the preceding views, and Figure 4 is a perspective view showing certain of the elements of the device detached from the tubular body and from one another.

The invention is designed primarily although not necessarily for use with tubular bodies constituting the inlets of receptacles for the so-called "dope" employed in effecting the lubrication of certain bearings of locomotive engines. It has been found in actual practice that the plugs closing the inlets of such receptacles work loose and are lost, whereupon the lubricant escapes from the receptacle and the bearings thus are not kept in a lubricated condition. As a result, the usual brass bushes used to line the bearings are quickly worn out and require replacement. A great saving will result when the plugs are held against accidental displacement and loss since the bearings will be kept in a lubricated condition and the brass bushes lining the bearings will last a relatively long time in service.

In carrying out my invention, I provide a frame which is substantially U-shaped in form and comprises a web or body portion 1 having extending from one face thereof a pair of substantially parallel spaced apart arms or lugs 2 and 3 respectively. The parallel arms 2 and 3 are provided with aligned openings 4 and 5 respectively, through which a headed pivot pin 6 may be projected, the pivot pin being held against any appreciable axial movement relatively to the arms 2 and 3 by a cotter pin 7 projected through a transverse opening 8 in the end portion of the pin 6 which is remote from the head of the latter.

A latch 8 comprises a body portion 9 tapering in width from one of its ends to its opposite end and being provided with a relatively thick bill portion 10 which extends from one corner portion of the body 9 at the relatively wide end of the latter, the bill portion 10 having a straight lower face 11 lying in a plane extending at an obtuse angle to the adjacent and relatively wide end face 12 of the body. The relatively wide end portion of the body is provided with an aperture 13 receiving the pivot pin 6 so that the latch 8 will be mounted for rotation and sliding movement on the pivot pin 6.

The arm 2 is enlarged in thickness from a line extending at right angles to the web portion 1 and located in a plane slightly below the level of the aligned openings 4 and 5 to its lower end. With this arrangement, a shoulder 14 extending the entire width of the arm 2 at right angles to the web portion 1 of the frame is defined at the upper end of the relatively thick portion of the arm 2. The relatively thick portion of the arm 2 is designated 15' and decreases in thickness from its lower end to the shoulder 14, whereby the inner face of the relatively thick portion of the arm 2 is inclined toward the shoulder 14 for a purpose to be hereinafter described.

The lower side of the body of the latch 8, that is the side of the body corresponding to the side 11 of the projection or bill portion 10, is straight and substantially parallel to the side 11 of the bill portion, being indicated at 15 in the drawings.

The arrangement is such that when the latch 8 has been swung about the axis of the pivot pin 6 so that the lower wall 11 of the bill projection 10 will rest upon the upper wall of the web portion 1, the lower wall 15 of the body of the latch will lie in a plane extending in parallel relation to the shoulder 14 and very slightly above the latter and therefore the lower wall 15 will engage with the shoulder 14 to prevent rotation of the latch when the latter has been slid along the pivot pin 6 to overlying relation to the shoulder 14. An expansion spring 16 disposed on the pivot pin 6 between the arm 3 and the body of the latch 8 tends to hold the latter in overlying relation to the shoulder 14.

It is to be observed at this point that the body 9 of the latch is of greater length than the arm 2 and that the portion of the body of the latch extending beyond the outer end of the arm 2 is bent slightly toward the plane of the arm 3. It also should be observed that the bill portion 10 of the latch is sufficiently long to extend across the web 1 and to terminate at a considerable distance beyond the plane of the face of the web opposite that which is provided with the arms 2 and 3.

From the foregoing description of the various parts of the device, the operation thereof may be readily understood. The web 1 is shown in Figures 1 to 3 inclusive as being permanently attached to the outer wall of a tubular member 17, as by being welded to the latter at 18 so that the arms 2 and 3 extend radially from the tubular member and are flush at their upper ends with the upper end of the tubular member. The tubular member which may be the inlet or fill neck of a lubricant receptacle or conduit is shown as being provided with internal screw threads 19 adapted for engagement with the threads of a plug 20 which constitutes a closure for the tubular member. The plug 20 may have the usual socket 21 in its outer face, with which any usual tool may be engaged to manipulate the plug when placing it in closing relation to the tubular member or displacing it for any purpose.

When the plug 20 is to be placed in threaded engagement with the tubular member 17, pressure is applied by the fingers against the latch 8 at opposite ends of the latter and the latch is moved in response to such pressure against the action of the spring 16, the latch sliding on the pivot pin 6 until out of engagement with the shoulder 14 and free to swing about the axis of the pivot pin 6 until the bill portion 10 has been swung upwardly and outwardly a distance sufficient to leave the outer end of the bore of the tubular member 17 unobstructed. The projecting relatively narrow rearward end portion of the body of the latch serves as a finger piece which can be conveniently pressed by the thumb or finger of a hand to cause the latch to swing about the axis of the pivot pin 6 in the manner described, the inwardly bent end portion of the body of the latch moving in sliding engagement with the inclined surface of the relatively thick portion 15' of the arm 2. The latch 8 can be swung outwardly about the axis of the pivot pin 6 until the straight wall 15 abuts the inner face of the web 1.

At this time, the bill projection 10 will be substantially vertical and the action of the spring 16 pressing the latch against the inclined inner face of the relatively thick portion 15' of the arm 2 will tend to hold the latch in outwardly swung or out of the way position. However, since the inner face slopes toward the shoulder 14, any jar or shock causing vibration of the latch 10 will cause the latter to swing inwardly and slide in engagement with the inclined sloping wall to the position illustrated in Figures 1 to 3 inclusive of the drawings. When in the position illustrated in the drawings and when the plug 20 has been placed in closing relation to the tubular member 17, the free end portion of the bill 10 will extend in overlying relation to the marginal portion of the plug and will thus prevent displacement of the plug from the bore of the tubular member.

The relatively heavy and thick bill 10 may be formed in one piece integral with the body of the latch or may comprise a plurality of connected together juxtaposed sections, as shown.

Obviously, my invention is susceptible of embodiment in forms other than that illustrated in the accompanying drawings and I therefore consider as my own all modifications and adaptations of the form of the device herein disclosed which fairly fall within the scope of the appended claims.

Having thus described the invention, what I claim is:—

1. A device of the character described comprising a frame consisting of a web portion adapted to be secured to the outer wall of a tubular member at one end of the latter and having a pair of laterally extending arms, and a latch pivotally supported intermediate its length between said arms and extending at its inner end beyond the inner wall of the tubular member.

2. A device of the character described comprising a frame consisting of a web adapted to be secured to the outer wall of a tubular member at one end of the latter and a pair of arms extending outwardly from the web, one of said arms being formed with a transverse shoulder on its inner wall below the level of the upper end of the latter, a pivot pin spanning the space between said arms at a level above said shoulder, an elongated latch member supported intermediate its length on said pivot pin to rotate and slide on the latter, said latch being sufficiently long to extend inwardly beyond the inner wall of the tubular member when in one position and having the lower wall thereof formed to engage with said shoulder to hold the latch against rotation on the pivot pin from said one position, and an expansion spring on said pivot pin reacting against said latch to tend to hold the latter in position to engage with said shoulder.

3. A device of the character described comprising a frame consisting of a web adapted to be secured to the outer wall of a tubular member at one end of the latter and a pair of arms extending outwardly from the web, one of said arms being formed with a transverse shoulder on its inner wall below the level of the upper end of the latter, a pivot pin spanning the space between said arms at a level above said shoulder, an elongated latch member supported intermediate its length on said pivot pin to rotate and slide on the latter, said latch being sufficiently long to extend inwardly beyond the inner wall of the tubular member when in one position and having the lower wall thereof formed to engage with said shoulder to hold the latch against rotation on the pivot pin from said one position, and an expansion spring on said pivot pin reacting against said latch to tend to hold the latter in position to engage with said shoulder, the said one arm of the frame being enlarged in thickness from said shoulder to the end of the arm remote from said pivot pin and having the inner wall of said relatively thick portion arranged to slope toward said shoulder.

4. A device of the character described comprising a frame consisting of a web adapted to be secured to the outer wall of a tubular member at one end of the latter and a pair of arms extending outwardly from the web, one of said arms being formed with a transverse shoulder on its inner wall below the level of the upper end of the latter, a pivot pin spanning the space between said arms at a level above said shoulder, an elongated latch member supported intermediate its length on said pivot pin to rotate and slide on the latter, said latch being sufficiently long to extend inwardly beyond the inner wall of the tubular member when in one position and having the lower wall thereof formed to engage with said shoulder to hold the latch against rotation on the pivot pin from said one position, and an expansion spring on said pivot pin reacting against said latch to tend to hold the latter in position to engage with said shoulder, the said one arm of the frame being enlarged in thickness from said shoulder to the end of the arm remote from said pivot pin and having the inner wall of said relatively thick portion arranged to slope toward said shoulder, the outer end portion of said latch being bent slightly toward the plane of the second arm to engage over a relatively great area with the sloping inner face of the relatively fixed portion of the first named arm.

5. A device of the character described comprising a frame consisting of a web adapted to be secured to the outer wall of a tubular member at one end of the latter and a pair of arms extending outwardly from the web, one of said arms being formed with a transverse shoulder on its inner wall below the level of the upper end of the latter, a pivot pin spanning the space between said arms at a level above said shoulder, an elongated latch member supported intermediate its length on said pivot pin to rotate and slide on the latter, said latch being sufficiently long to extend inwardly beyond the inner wall of the tubular member when in one position and having the lower wall thereof formed to engage with said shoulder to hold the latch against rotation on the pivot pin from said one position, and an expansion spring on said pivot pin reacting against said latch to tend to hold the latter in position to engage with said shoulder, the inner end portion of said latch being relatively thick and heavy.

6. A device of the character described comprising a supporting member, a pivot element carried by the supporting member, a latch supported intermediate its length on said pivot element, said latch having limited sliding movement along said pivot element, said supporting member having a stop for engaging with said latch when the latter is at the limit of its travel in one direction along the pivot element, said latch being held against swinging about the axis of the pivot element when the latch is in engagement with said stop, and a spring continuously urging said latch toward position on said pivot element to engage with said stop.

FRED. W. JACKSON.